April 21, 1925.   1,534,922
E. F. DAUTEUIL
MUD GUARD FOR MOTOR VEHICLES
Filed Dec. 21, 1923   4 Sheets-Sheet 1

INVENTOR
EDOUARD FERNAND DAUTEUIL
BY
ATTORNEY

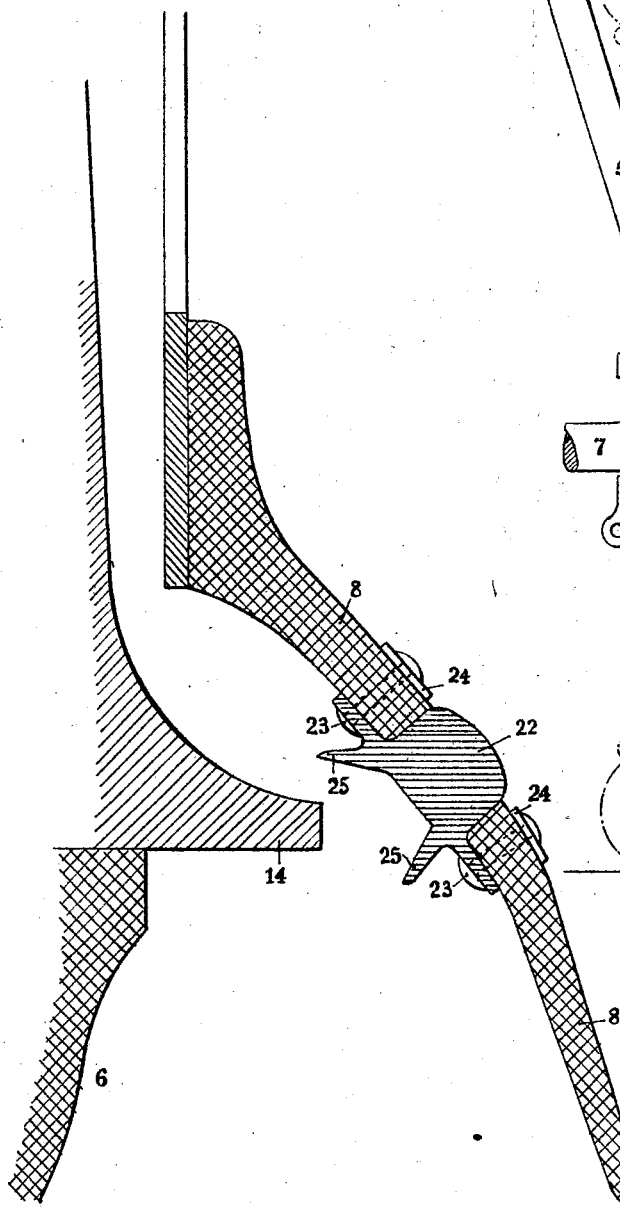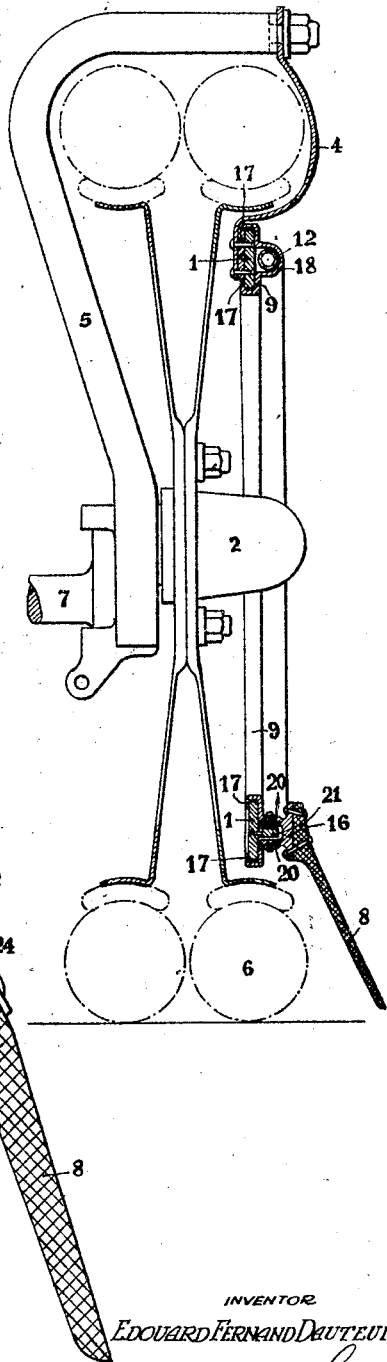

April 21, 1925. 1,534,922
E. F. DAUTEUIL
MUD GUARD FOR MOTOR VEHICLES
Filed Dec. 21, 1923 4 Sheets-Sheet 3

INVENTOR
EDOUARD FERNAND DAUTEUIL
BY
ATTORNEY

April 21, 1925.

E. F. DAUTEUIL 1,534,922

MUD GUARD FOR MOTOR VEHICLES

Filed Dec. 21, 1923

INVENTOR

Edouard Fernand Dauteuil
BY
ATTORNEY

Patented Apr. 21, 1925.

1,534,922

UNITED STATES PATENT OFFICE.

EDOUARD FERNAND DAUTEUIL, OF ST.-DENIS, FRANCE.

MUD GUARD FOR MOTOR VEHICLES.

Application filed December 21, 1923. Serial No. 682,041.

*To all whom it may concern:*

Be it known that I, EDOUARD FERNAND DAUTEUIL, of 17 Boulevard Felix - Faure, St.-Denis, Seine, France, mechanician, have invented Mud Guards for Motor Vehicles, of which the following is a full, clear, and exact description.

In the patent filed 30 March 1923 Serial No. 628,882, has been described a mud guard for motor vehicles characterized by the combination:

(*a*) Of a collar concentric with the hub and immobilized by arms secured on the axle or on the axle arm.

(*b*) Of a mud guard proper mounted on a crown concentric with this collar about which it can rotate and can be brought back to its normal position by springs or by its own weight.

The present patent has for its object an improved form of construction of the above mud guard and is characterized by the following points:

1. The crown on which is mounted the protecting rubber band of the mud guard, is devised in such a manner as to form a circular chamber within which is arranged a circumferential coil spring adapted to bring back the mud guard to its normal position, this spring taking a bearing, at its ends, on the opposed faces of abutments respectively rigid with the fixed collar and the movable crown concentrically mounted on the latter and carrying the protecting rubber band.

2. In the case of application of the mud guard to heavy vehicles the metallic rim of which projects outside the tyre, the protecting band is provided with steel buffers so arranged as to encounter and fit on the edge of the rim for avoiding the deterioration of the band when the latter is brought in contact with the curbstone of a pavement.

In order that the invention may be clearly understood, it will be described hereafter with reference to the accompanying drawing in which:

Figs. 1 and 2 are respectively a front elevation and a vertical section of a mud guard applied for instance to a wheel with twin tyres.

Fig. 6 is a detail.

Figure 1:
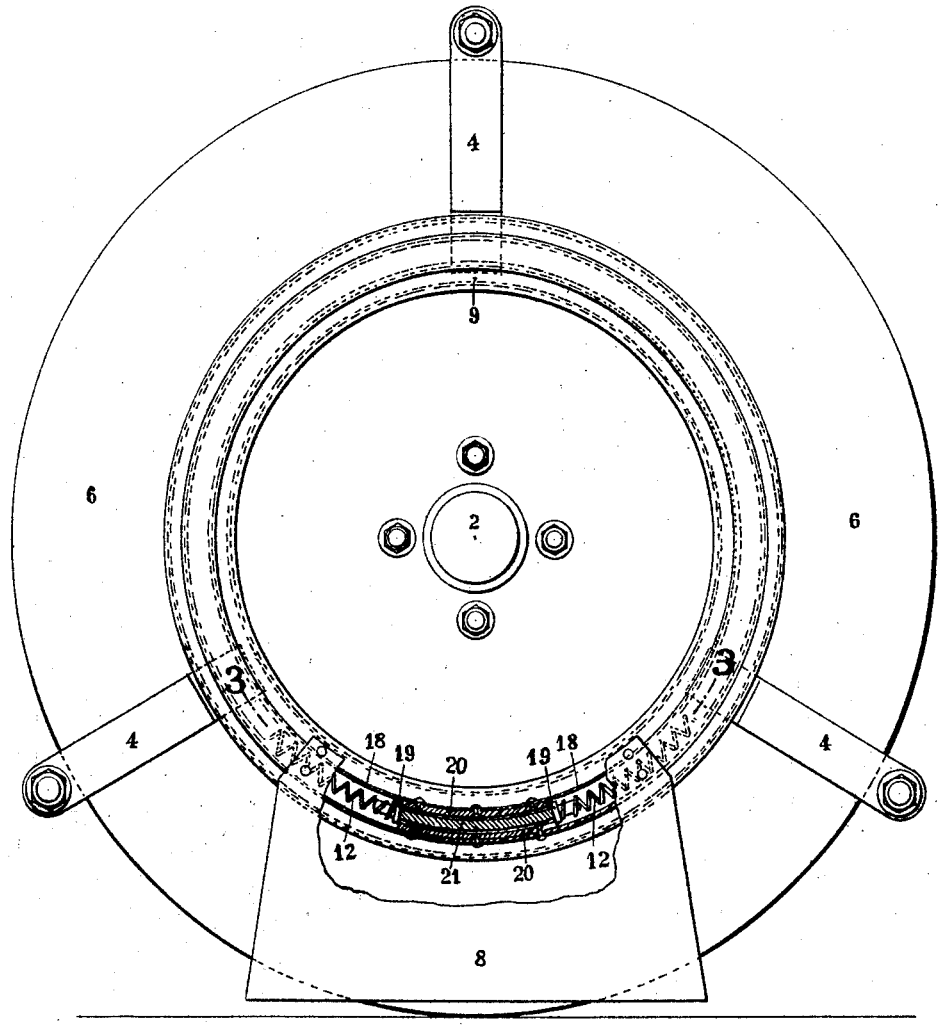
Figure 3:
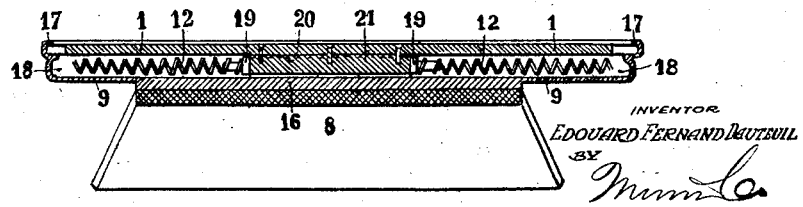
Fig. 3 is a developed horizontal section made according to line 3—3 of Fig. 1.

As illustrated in Figs. 1 to 3 of the accompanying drawing, the collar arranged concentric with the hub 2 of the wheel, as described in the patent Serial No. 628,882, is constituted by a flat circle or ring 1 suitably supported within the wheel, so as to avoid any external shock by arms 4 secured on the said ring and on other supporting arms 5 rigidly connected to the axle 7 at the rear of the wheel.

The protecting band 8 is secured on a segment 16 of a crown 9 mounted with slight friction on the ring 1 on which it is held by flanges 17, so as to be capable of rotating on the said ring without transversely moving when the band 8 is pressed between a pavement and the wheel and it drawn along in the movement of rotation of the latter.

According to the present patent, this protecting band is normally held in the position illustrated in the drawing by a coil spring 12 which is freely placed in a circular chamber 18 formed by the crown 9 itself, or secured on the latter.

This spring 12 takes a bearing, at its ends provided with metallic buffers 19, against the opposed faces of abutments 20 secured within the movable crown 9 and concentric with another abutment 21 rigid with the fixed ring 1, as clearly illustrated in the drawing.

With this arrangement, when the band 8 is pressed between the curbstone of a pavement and the tyre 6 (Figs. 1 and 2), or between the curbstone of a pavement and the rim 14 (Figs. 4 and 5), the said band 8 and the crown 9 which carries it are drawn along in the movement of rotation of the wheel; the spring 12 pushed back by the movable abutments 20 against the fixed abutment 21 is thus compressed during the time the band 8 is pressed and drawn along and relaxes as soon as the band is no longer pressed, thereby bringing back the band 8 to its normal position.

Figure 4:
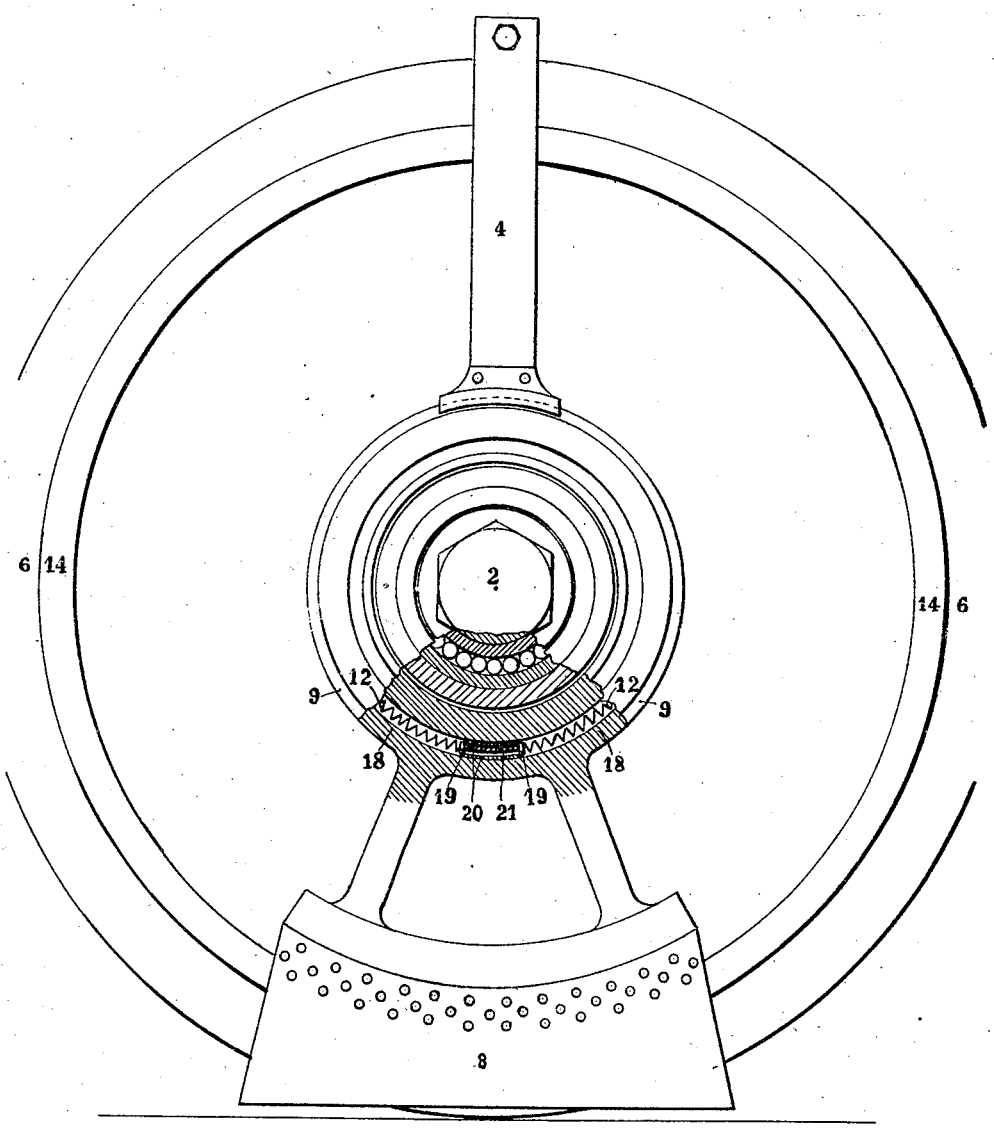
Figs. 4 and 5 illustrate a modification in front elevation and vertical section.
Figure 5:
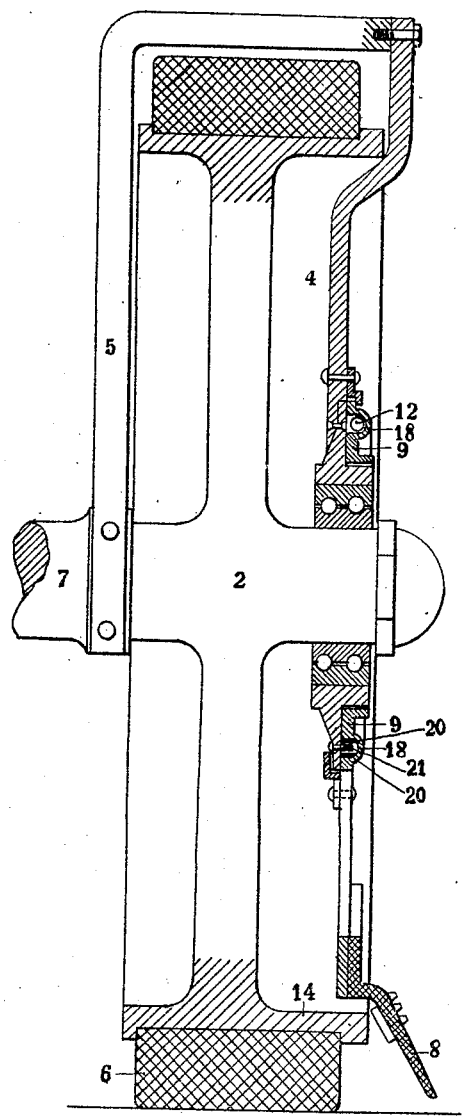

In the form of construction illustrated in Figs. 1 to 3, the mud guard in accordance with the invention is shown as fitted to a wheel with twin tyres, whilst in the form of construction of Figs. 4 and 5, the mud guard is mounted on a wheel, with a laterally projecting rim, of a heavy vehicle, as described in the patent Serial No. 628,882.

In this modification, the spring 12 is enclosed in a circular chamber 18 formed or secured on the movable crown 9, as above described with reference to Figs. 1 to 3, and and band 8 of rubber or other material is provided with a number of steel buffers 22 secured by means of rivets 23 and of washers 24 and so arranged as to avoid tearing the said band when the latter is pressed between the curbstone of a pavement and the laterally projecting rim.

For that purpose, these buffers 22 are provided with two inner wings 25 directed towards the said rim and fitting on the latter for supporting shocks in case of coming in contact with a pavement and thus avoiding the tearing away of the said band.

The above described arrangements are of course, given by way of example only; the forms, materials and dimensions of the constituent parts may be varied according to the types of wheels and of vehicles to which is fitted the mud guard of the invention.

Claims.

1. A mud guard for the wheels of motor and other vehicles comprising in combination: supports secured on the axle,—arms secured on these supports,—a collar rigid with these arms and concentric with the axis of the wheel,—a crown mounted on the said collar and capable of rotating on the latter,—said crown having a chamber, a protecting band carried by the said crown,—means for ensuring the connection of the movable crown and of the fixed collar,—and means for bringing back the protecting band to normal position after displacement,—said means including a spring in the chamber of the crown.

2. A mud guard for wheels of motor and other vehicles comprising in combination: supports secured on the axle,—arms secured on these supports,—a collar rigid with these arms and concentric with the axis of the wheel,—a chambered crown mounted on the said collar and capable of rotating on the latter,—a protecting band carried by the said crown,—members adapted to connect in the transverse direction the fixed collar and the movable crown and to prevent the latter and the protecting band it carries from accidentally coming off the said collar,—and means for bringing back the protecting band to normal position after displacement,—said means comprising abutments in the chamber of the crown, an abutment on the collar between the abutments of the crown, a coil spring in the chamber of the crown, and buffers at the ends of the spring and bearing on the said abutments.

3. A mud guard for the wheels of motor and other vehicles comprising in combination: supports secured on the axle,—arms secured on these supports,—a collar rigid with these arms and concentric with the axis of the wheel,—a crown mounted on the said collar and capable of rotating on the latter,—a protecting band carried by the said crown,—members adapted to connect in the transverse direction the fixed collar and the movable crown and to prevent the latter and the protecting band it carries from accidentally coming off the said collar,—a circular chamber formed in the movable crown,—abutments secured in the latter,—an abutment rigid with the fixed collar and arranged between the abutments of the movable crown,—a coil spring arranged in the circular chamber,—buffers at the ends of this spring and taking a bearing on the opposed faces of the abutments of the movable crown and fixed collar,—means for strengthening the said band and preventing it from tearing.

4. A mud guard for the wheel of motor and other vehicles comprising in combination: supports secured on the axle,—arms secured on these supports,—a collar rigid with these arms and concentric with the axis of the wheel,—a crown mounted on the said collar and capable of rotating on the latter,—a protecting band carried by the said crown,—members adapted to connect in the transverse direction the fixed collar and the movable crown and to prevent the latter and the protecting band it carries from accidentally coming off the said collar,— a circular chamber formed in the movable crown,—abutments secured in the latter,— an abutment rigid with the fixed collar and arranged between the abutments of the movable crown,—a coil spring arranged in the circular chamber,—buffers at the ends of this spring and taking a bearing on the opposed faces of the abutments of the movable crown and fixed collar,—metallic buffers in the protecting band and projecting on the outer face of the latter,—ribs on the said buffers, these ribs projecting on the inner face of the said protecting band and being adapted to come in engagement with the rim when this band is pressed between the rim and the curbstone of a pavement.

The foregoing specification of my "Mud guard for motor vehicles" signed by me this 7th day of December 1923.

EDOUARD FERNAND DAUTEUIL.